United States Patent [19]

Bates et al.

[11] Patent Number: 4,899,327
[45] Date of Patent: Feb. 6, 1990

[54] FOCUS SERVO LOOP CORRECTION

[75] Inventors: Keith A. Bates, Lafayette; Russell A. Budd, Longmont; Millard A. Habegger, Boulder; Mark L. Rhoades, Longmont, all of Colo.

[73] Assignee: International Business Machines Corporation, Armonk, N.Y.

[21] Appl. No.: 52,115

[22] Filed: May 4, 1987

Related U.S. Application Data

[63] Continuation of Ser. No. 698,517, Feb. 4, 1985, abandoned.

[51] Int. Cl.[4] .................. G11B 7/08; G11B 21/00; H04N 5/76
[52] U.S. Cl. .................................. 369/45; 250/201; 369/46; 369/106; 369/120; 369/122
[58] Field of Search ................. 369/44, 45, 46, 54, 369/116, 106, 120, 121, 122; 250/201

[56] References Cited

U.S. PATENT DOCUMENTS

| | | | |
|---|---|---|---|
| 4,005,259 | 1/1977 | Kaneko | 369/120 |
| 4,051,329 | 9/1977 | Blondet | 369/54 |
| 4,059,841 | 11/1977 | Bricot | 369/45 |
| 4,163,149 | 7/1979 | Sawano et al. | 250/204 |
| 4,190,775 | 2/1980 | Sakurai et al. | 250/570 |
| 4,243,848 | 1/1981 | Utsumi | 369/45 |
| 4,357,696 | 1/1982 | Bierhoff et al. | 369/45 |
| 4,368,526 | 1/1983 | Harigae et al. | 369/45 |
| 4,418,406 | 11/1983 | Ogawa | 369/124 |
| 4,475,182 | 10/1984 | Hosaka | 369/46 |
| 4,482,987 | 11/1984 | Ohara | 369/44 |
| 4,509,156 | 4/1985 | Ohara | 369/116 |
| 4,607,157 | 8/1986 | Millar | 369/45 |
| 4,658,391 | 4/1987 | Nozu | 369/46 |
| 4,661,944 | 4/1987 | Sherp | 369/44 |
| 4,663,750 | 5/1987 | Kamanaka | 369/46 |

FOREIGN PATENT DOCUMENTS

| | | | |
|---|---|---|---|
| 7902 | 2/1980 | European Pat. Off. | 369/45 |
| 53030 | 3/1983 | Japan | 369/45 |
| 2090437 | 7/1982 | United Kingdom | 369/45 |

OTHER PUBLICATIONS

Patent Abstracts of Japan, vol. 7, No. 286 (p. 244), 12/21/83.
Patent Abstracts of Japan, vol. 8, No. 97 (p. 272), 5/8/84.
Patent Abstracts of Japan, vol. 7, No. 138 (p. 204), 6/16/83.
Patent Abstracts of Japan, vol. 7, No. 234 (p. 230), 10/18/83.
Patent Abstracts of Japan, vol. 8, No. 65 (p. 263), 3/27/84.
Patent Abstracts of Japan, vol. 7, No. 180 (p. 215), 8/9/83.

Primary Examiner—Steven L. Stephan
Attorney, Agent, or Firm—Carl M. Wright

[57] ABSTRACT

Error correction in a feedback servo system. The feedback servo loop in, for example, a head positioning circuit in an optical disk data recording and retrieval system is provided with means for forcing the feedback signal to zero when the head is positioned at best focus as determined by a peak in the laser monitoring diode. The head in such a system must be dynamically maintained at a best focus position but, through use and transporting, the alignment of the head position error detecting system can be disturbed. In some cases, the loop circuit parameters may drift from their original values. To correct for errors introduced from such causes, the head is positioned at best focus and the focus error (head position error) signal is sensed. A correction system forces the sensed value to zero, e.g, by adjusting the gain of amplifiers used in the feedback loop.

3 Claims, 4 Drawing Sheets

FIG. 2B    FIG. 2A    FIG. 2C
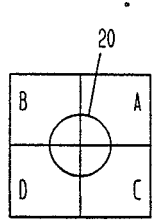
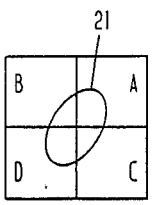
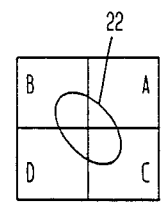
FIG. 3
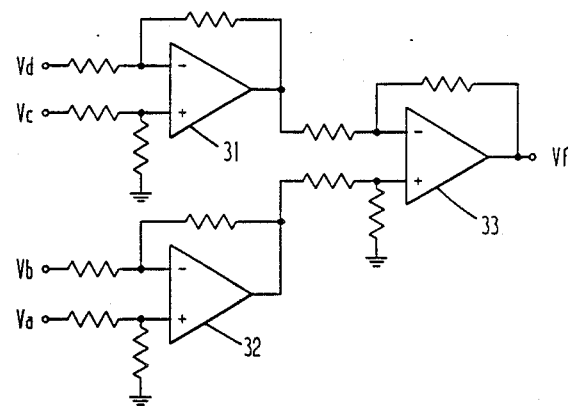
FIG. 4A    FIG. 4B
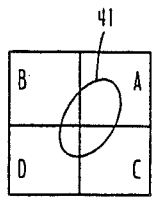
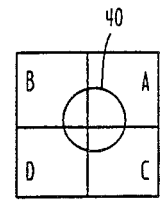

FOCUS SERVO LOOP CORRECTION

This application is a continuation of U.S. Ser. No. 698517, filed on Feb. 4, 1985, now abandoned.

DOCUMENTS INCORPORATED BY REFERENCE

U.S. Pat. No. 4,059,841 is incorporated herein by reference and shows a feedback focus control loop using quadrature diodes and the establishment of best focus by detection of the maximum value of differentiated read signal.

TECHNICAL FIELD

This invention relates to servo loop control and particularly to servo loops used by optical readers to maintain a light beam at best focus.

The focus servo loop parameters change with time and use causing the focusing system to lose best focus. The parameters most subject to change are the alignment of the optical paths associated with the quadrant diode detectors, gain of the diode signal preamplifiers, the laser beam profile, and overall response caused by foreign material contaminating the optical path.

BACKGROUND ART

A quadrature diode detector is commonly used in optical reader heads to sense the laser or light beam reflected from the storage medium. Amplified output signals from the diodes are used to control the focus servo system to keep the laser dynamically focused on the medium. Close control of the focus is necessary because the medium surface has large relative runout compared to the depth of field of the lens that focuses the light to a spot small enough to discern the one micron information bit size.

U.S. Pat. No. 4,368,526 shows a comparator for detecting the maximum peak of a differentiated read signal to establish the best focus in an open loop circuit. When the best open loop focus is established, the focus control loop is closed to operate as a servo loop using a quadrant diode detecting scheme.

U.S. Pat. No. 4,243,848 shows a focus controller using photodetectors disposed at one of the conjugate planes of the converging lens and others on the focal plane of the objective lens. The diodes are aligned in a direction corresponding to the movement of the images of the information bits as they are read. Using a phase relationship among the photodiode signals, a drive coil is controlled to maintain the light beam at best focus on the disk.

U.S Pat. No. 4,059,841, incorporated herein by reference, is directed to the use of four diodes arranged in quadrature to detect a projected quasipunctiform spot for providing feedback to a focus control circuit.

U.S. Pat. No. 4,163,149 is directed to the correction of a focus control signal error component caused by tracking offsets. It uses quadrature diodes to provide a focus control signal derived from the difference of opposed diode signals and a compensation signal from the sum of adjacent diode signals. That is, a correction signal is supplied to compensate for the lateral movement of the focus circle on the diodes due to the action of the tracking movement.

U.S. Pat. No. 4,190,775 discloses an optical memory playback apparatus using an electroluminescent semiconductor element as both the source of light and the sensor. The semiconductor element is a three-mirror resonator constructed of an outer mirror and a laser element. Information is stored in the form of variations in the reflection factor of the outer mirrors and is read out by allowing the variation in the light output, viz, the presence or absence of oscillation, directed onto the semiconductor element which also acts as the sensor.

None of the prior art shows, suggests, or teaches the use of a compensation to correct errors from misalignment, component aging, parameter changes, or such other causes of focus error. None of the prior art references teach, suggest, or show the use of the monitor diode output signal for detecting that the head is at best focus.

DISCLOSURE OF THE INVENTION

A system for storing information on a reflective medium by variation in the reflectivity of the medium surface has a source, such as a laser, to provide a beam of radiant energy, focused onto the surface of the medium for recording or retrieving information on the medium. A monitoring device such as a diode is used to maintain the energy level of the beam at a constant, predetermined level. A focusing lens system in a movable head with a servo feedback control loop keeps the beam dynamically focused on the medium surface using a focus error signal.

In accordance with the invention, the monitor signal is used to establish the best focus position of the head. If, while at best focus, the focus error signal is not zero, the feedback circuits are corrected so as to force the focus error signal to zero.

Among the advantages of the invention to be described is improvement of the focus servo system reliability. It adaptably removes focus error signal tolerance variations caused by aging, wear and tear, or misalignment. The system of the invention is economically implemented, adaptable to microprocessor control and shared microprocessor circuitry which can be used with other parts of the system.

BRIEF DESCRIPTION OF THE DRAWING

FIGS. 2A–2C are illustrations of the beam shape that falls on the quadrature diode detectors at various lens distances from the media.

FIG. 3 is a schematic of a typical focus error signal generator.

FIGS. 4A–4B are illustrations of the beam shapes falling on the quadrature diodes when the optical path is out of alignment.

DETAILED DESCRIPTION

An explanation of the operation of a prior art focus system is first discussed to provide the background for a clear understanding of the invention.

Figure 1:
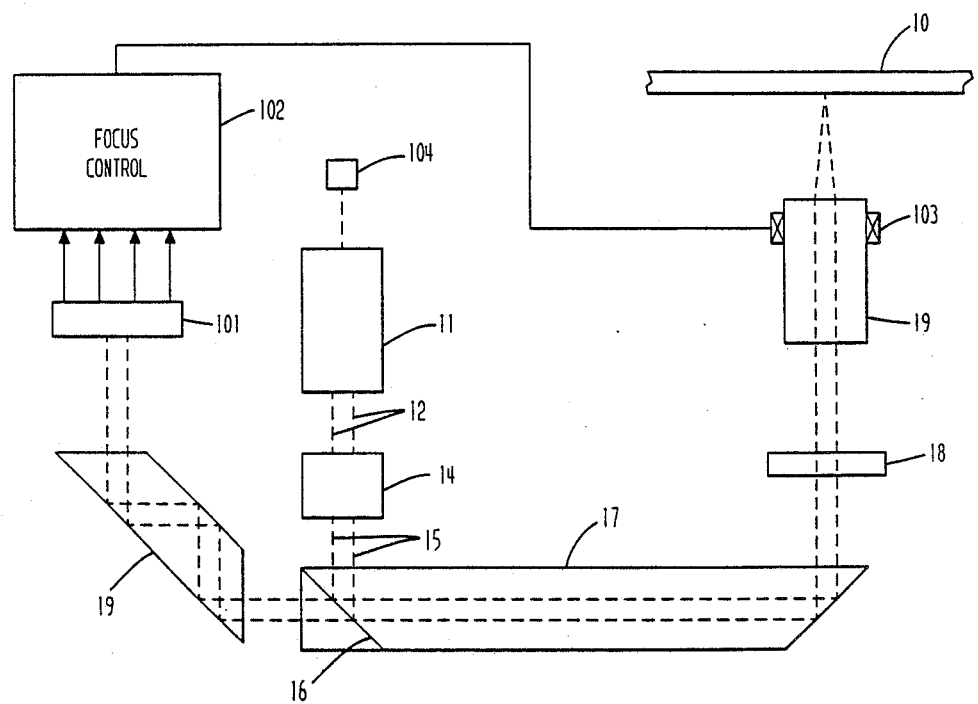
FIG. 1 is a representation of lens and detection arrangement for an optical disk reading or recording system.

An optical system for a typical optical disk reader is illustrated in FIG. 1. A suitable source of light energy, typically a solid state laser 11, generates a beam of light energy 12 which is passed through collimator lens 14 to form a collimated beam 15.

The collimated beam 15 is directed to a polarizing prism 17 which includes a beam splitter 16. The beam 15 is thereby directed to the right and up through a quarter wave plate 18, circularly polarizing the beam, which is then passed through an object lens 19 to focus on the reflective surface 10 of an optical disk.

The light reflected from the disk surface 10 passes through the object lens 19 and through the quarter wave plate 18 to the polarizing prism 17. The beam splitter 16 allows a portion of the reflected beam through the end of the polarizing prism 17 to a critical angle reflecting prism 119 which directs the portion of the reflected beam onto quadrature diodes 101. The output signals from the quadrature diodes 101 are coupled to a focus control unit 102 which supplies a drive signal to an object lens focus actuator 103.

A monitor diode 104 detects a portion of the laser beam reflected from the beam splitter 16 back through the collimator lens 14 and through the solid state laser 11. The monitor diode 104 supplies a feedback control signal used in the prior art to maintain the laser output power at a constant, predetermined value.

The portion of the reflected laser beam from the optical disk surface 10 being read is directed onto a quadrature diode arrangement 101 shown in FIG. 2. Because of the lens arrangement and beam polarization, when the beam is focused on the disk surface 10, the reflected beam is a circle centered at the common junction point of the diodes. For example, in FIG. 2A, a reflected circular beam 20 is centered at the common junction point of four photodiodes A, B, C, and D. As a result, each of the photodiodes A-D receives an equal amount of energy and the voltage output signal from each diode is equal.

When the beam is not at best focus on the optical disk surface 10, the polarization and lens arrangement causes the beam shape to become elliptical as illustrated in FIGS. 2B and 2C. When out of focus in a certain direction, e.g., toward, a beam 21 is positioned so that the photodiodes A and D receive more energy than the photodiodes B and C as illustrated in FIG. 2B.

When the beam is out of focus in the other direction, e.g., away, the beam again becomes elliptical, but with its major axis approximately at right angles to the previous ellipse formed by the beam out of focus in the opposite direction. The out-of-focus-away situation is illustrated as the beam 22 in FIG. 2C, positioned so that the photodiodes B and C receive more energy from the beam than do the photodiodes A and D.

A focus signal can be derived as $Vf=(Va+Vd)-(Vb+Vc)$ where Va is the voltage output signal from the photodiode A; Vb, from the photodiode B; Vc, from the photodiode C; and Vd, from the photodiode D.

When Vf=0, which would be the result when the beam is circular and centered as shown in FIG. 2A, the beam is at best focus. That is, when the system is operating correctly, Vf=0 when the reading laser beam is at best focus on the optical disk surface 10.

When the beam is out of focus in the toward direction to cause the beam on the photodiodes to appear as shown in FIG. 2B, the signal Vf will be some non-zero positive value. When out of focus in the other direction, i.e., the situation shown in FIG. 2C, the signal Vf will be some negative value.

The laser beam object lens system 19 is mounted in a frame that is movable in either direction perpendicular to the focusing plane which, in the illustrative system being described, is the disk surface 10. Such a system can use an electrical linear motor shown in FIG. 1 as the object lens focusing actuator 103. A focus drive signal is supplied to keep the beam in focus. The focus signal, Vf, is combined with the focus drive system to keep the beam in focus. That is, when Vf is positive, the lens system 19 is offset by the Vf value in a direction to bring the beam back into focus. When Vf is negative, the lens system 19 is displaced in the other direction so as to bring the beam back into focus.

A suitable focus control 102 is illustrated in FIG. 3. The focus voltage, Vf, equal to $Va+Vd-(Vb+Vc)$, can be rearranged to $$Vf=(Va-Vb)-(Vc-Vd) \qquad (1)$$

to take advantage of commercially available difference amplifiers.

Equation (1) is implemented by the circuit illustrated in FIG. 3. The difference amplifiers 31–33 are coupled as shown using resistors whose values can readily be determined by one of ordinary skill in the art. The circuit output signal, Vf, is coupled to the focus actuator 103 to supply a signal having the polarity and magnitude necessary to bring the laser beam into best focus on the disk surface 10.

More detailed explanations of the above-described prior art focus adjustment system are found in U.S. Pat. Nos. 4,163,149 and 4,368,526.

A problem with this prior art system for keeping the laser beam in focus is that misalignment of the optical system can cause errors. For example, if the optical system is misaligned, the beam may not center on the diodes. This will cause the feedback to be other than zero when the beam is at best focus. Another cause of error is change in circuit parameters, e.g., drift in the difference amplifiers values such off-set voltages or gain or change in resistor values.

Misalignment of parts of the optical system or drift in circuit parameter values will preclude the servomechanism of the focusing system from keeping the beam in best focus. FIG. 4 illustrates the situation where the optics have been misaligned so that the circle produced at best focus does not fall on all diodes equally. As shown, the circle will produce a focus actuator drive signal as if the system were out of focus in the toward direction. That is, the value of Va+Vd will exceed that of Vb+Vc. Therefore, the quality of the read signal will degrade to the point of being nonfunctional.

The invention to be described and illustrated below is directed to correcting the focus drive signal when errors such as those described above begin to affect the accuracy of the focusing system.

Adaptive focus error compensation requires some indication of optimum or best focus separate from the primary loop so that focus error signal misadjustment can be determined. In addition to the maximum data indicator method, several other techniques are practical, all of which have been successfully used in the prior art.

An optically aligned head results in a DC voltage peak of either polarity, depending on amplifier inversions, of the data signal, which is the four-quadrant signal summed, when at best focus. This peak may be sensed as a best focus indicator.

In a second method, a test area of a track is reserved for best focus testing and written under varying conditions of focus. Optimum write focus, which tends to be a more critical indicator than read focus, can then be determined from the resulting written area based on correlation with a known applied offset correction.

In a method with grooved or otherwise prewritten media, such as stamped grooveless data disks, track crossing signals occur prior to closing of the track-following loop. This signal may be utilized for best focus determination in at least two ways.

The simplest of these, applicable to all types of tracks, is to look for a peak signal level as with the summed DC data signal. Grooved media produce a tracking signal with a "dog leg" as the laser spot tracks open-loop over the groove and land areas. This dog leg is a sensitive indicator of actual focus. When it is flattest or has a slight negative slope, depending on groove width, optical alignment, detector gains, and located properly with respect to signal peaks, the head is servoed to best focus. This best focus dog leg detection can be accomplished by digitizing the tracking error signal followed by an identification of the inflection points. After differentiation, locations of consecutive positive and negative peaks in time are compared, using amplitude comparators to separate major and minor peaks, simplifying the timing logic for interpretation in identifying dog leg duration.

Since best focus corresponds to minimum laser spot size, read back signals such as tracking or data will exhibit best edge definition at this point. That is, the signals will have the fastest rise and fall times at focus. Several types of rise and fall time comparison circuits can be envisioned; one possibility is the input signal being differentiated at best focus corresponding to that error correction which results in the peak derivative.

An optical technique employing track crossings for information and best focus compensation might effectively use a combination of the above described techniques. Experiments have shown that the best focus derived from a maximization of dog leg or peak derivative while simultaneously maintaining peak signal amplitude provides ample performance. This approach is particularly valuable because other variables, such as mechanical runout on the disk, bearings or track grooves, reflectance variations, optical misalignments, and so on, result in modulation of the signal around the media circumference. Integration of the key indicators over a single revolution is desirable.

This invention uses a novel indication of best focus not suggested or shown in the prior art. It is based on detecting peaks in the signal from the laser monitor diode. This is discussed in greater detail below.

Figure 5:
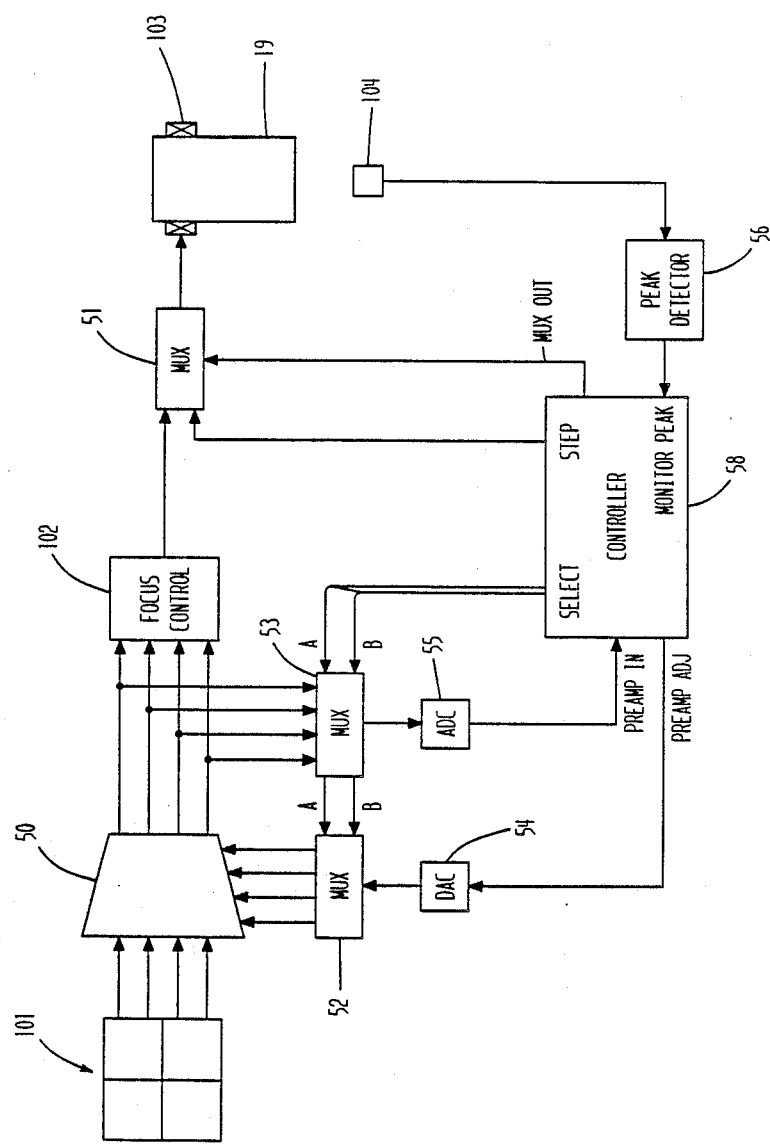
FIG. 5 is a schematic of a focus control system according to the invention.

A system according to the invention is shown in FIG. 5. The quadrature diodes 101 supply output signals to four adjustable gain preamplifiers 50. The output signals from the preamplifiers 50 are coupled to the focus control 102 and, via a multiplexor 53 and an analog-to-digital converter 55, to an input port of a controller 58.

The controller 58 supplies an output signal via a digital-to-analog converter 54 and a multiplexor 52 to the preamplifiers 50 to adjust the gain of the individual preamplifiers.

A multiplexor 51 is controlled by an output signal from the controller 58 to couple selectively a focus control signal from the focus control 102 or a step signal from the controller 58 to the focus actuator 103 that positions the head 19.

The monitor diode 104 supplies a signal to a peak detector 56 which supplies a signal to the controller 58 when the signal from the monitor diode 104 reaches a peak value.

The multiplexors 51, 52, and 53 are commercially available devices. The multiplexor 51 receives two input signals and, depending on the value of the control signal (MUX_OUT), couples one of the input signals to the output terminal which is coupled to the focus actuator 103. The MUX_OUT signal is a binary signal, assuming one of two possible values, commonly named TRUE and FALSE. When the value of MUX_OUT is FALSE, it is assumed that the focus control signal is coupled to the output terminal. When MUX_OUT is TRUE, the STEP signal is coupled to the output terminal.

The multiplexor 53 has four input terminals and two control signals. The control signals are each independently TRUE or FALSE and the following table shows the input terminal coupled to the output terminal, called the active input terminal, according the values of the control signals.

| Control Signals | | |
|---|---|---|
| A | B | Active Input Terminal |
| FALSE | FALSE | 1 |
| FALSE | TRUE | 2 |
| TRUE | FALSE | 3 |
| TRUE | TRUE | 4 |

For purposes of explanation, it assumed that the output value of the control signals A and B can be designated by the number of the active input terminal. That is, a SELECT output value couples the input terminal corresponding to that value to the output terminal. For example, if the SELECT output value is designated as 1, then A and B will both be FALSE. This is within the skill of the art and is well known.

The multiplexor 52 is sometimes called a demultiplexor in that it couples a single input terminal selectively to one of four output terminals. The multiplexor 52 responds to the control signals A and B in a similar manner as that described for the multiplexor 53 except that the selected terminal is called the active output terminal.

The peak detector 56 is also a commercially available device and supplies an output signal when the input signal reaches a peak value. The peak value may be in a positive or negative direction. The peak detector 56 is assumed to be the proper polarity peak detector for the application.

The monitor diode 104 which receives a portion of the laser energy and is used to control the energy level of the output of the laser. It has been discovered, however, that the output signal from the monitor diode 104, because it also receives a fraction of the reflected signal, exhibits a peak value when the laser beam is at best focus on the disk surface 10 (FIG. 1). Therefore, it can provide an indication of best focus for supplying a correction signal to the focus error signal if the latter is not zero when the laser beam is at best focus.

The four diode preamplifiers 50 have adjustable gain. There are several commercially available amplifier devices that have adjustable gain. One example is a multiplying DAC (digital-to-analog converter) which is provided with input terminals for receiving a binary number signifying the multiplier. Other circuits include converters to supply a binary signal from the input analog signal, arithmetic circuits to perform multiplication, and converters to restore the resulting binary product to an analog signal. Other circuits include variable bias amplifiers with means for receiving a gain control signal and converting it to bias signal value which will change the gain to provide the desired value.

Figure 6:
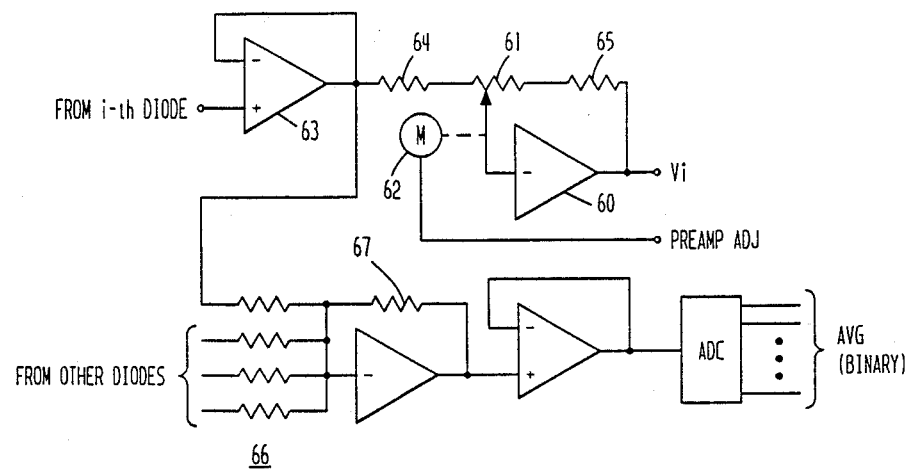
FIG. 6 is a schematic of a variable gain preamplifier and an averaging circuit usable with the system of FIG. 5.

For purposes of illustration, another version of an adjustable gain amplifier can be used. Such a circuit is illustrated in FIG. 6. An ordinary inverting operational amplifier (assumed to have negative infinite gain, infinite input impedance, and zero output impedance) has the usual feedback resistor configuration. The input and feedback resistor, however, share a variable resistance. Varying the position of the wiper of the resistance 61, typically a potentiometer, varies the gain of the circuit. A stepping motor 62 is coupled to the wiper control shaft of the resistance 61 and, in response to a positive pulse, moves the wiper to increase the gain of the circuit and, in response to a negative pulse, moves the wiper to reduce the circuit gain. The resistors 64 and 65 are boundary value limiters to prevent either the input or feedback impedances from going to zero.

An ordinary unit feedback amplifier circuit 63 is supplied to provide a high input impedance for the photodiode and a low output impedance to the preamplifier circuit. A separate preamplifier circuit would be provided for each of the four quadrature diodes.

An analog averaging circuit is also illustrated and is well known in the art. Each of the input resistors 66 is four times the value of the feedback resistor 67 so that the output signal from the amplifier is the sum of the input values divided by four. A unit gain buffer amplifier and an analog-to-digital converter are provided to couple the averaged value to a digital computer. Each of the input resistors 66 is coupled to a separate one of the quadrature diodes.

The preamplifier circuits invert the diode signals so unit gain inverting amplifiers can be provided to re-invert the preamplifier output signals or the signals Va and Vc can be exchanged in the focus control circuit and so can the signals Vb and Vd which will merely reverse the values in equation (1), supra. That is, $$Vf=(-Vb-(-Va))-(-Vd-(-Vc)) \qquad (2)$$

which has the same value as equation (1).

The system of FIG. 5 operates as follows. The controller 58 supplies a TRUE MUX_OUT signal which decouples the focus control signal from focus actuator 103 and couples a zero value STEP signal. This is presumed to cause the head 19 with the lens system to assume a quiescent position at one limit of its travel. Positive value signals cause the head 19 to move toward its other limit, the distance moved being proportional to the magnitude of the signal.

The STEP signal is incremented by a small amount, designated DELSTEP, causing the head 19 to move toward its other limit. When the head 19 reaches the position of best focus, the peak detector 56 supplies a signal to the controller 58 which then holds the head in the best focus position.

The output signals from the controller are assumed to be latched, i.e., they remain the same value until changed by the controller 58.

The output signal value from each preamplifier is sensed and adjusted so as to cause the focus error signal to be zero. One method is to average the values of preamplifier outputs and to adjust the value of each preamplifiers gain so its output signal equals the average.

The average can be obtained by using a circuit such as shown in FIG. 6 or by summing the values of preamplifiers' output signals and dividing by four. Division by four is easily performed digitally by shifting the binary sum two bit positions to the right.

After the average has been obtained, the output signal from each of the preamplifiers 50 is sensed and adjusted to the desired value by providing a +1 pulse on the PREAMP$_{13}$ ADJ line or a −1 pulse. A digital-to-analog converter 54 is supplied to convert the pulse to a negative pulse when the value is −1 since the controller, preferably a properly programmed microprocessor, uses 2−s-complement arithmetic.

To steer the preamplifier inputs to the processor and the PREAMP$_{13}$ADJ signal to the proper preamplifier, the control signals A and B are generated as required.

These steps are preferably performed by a programmed microprocessor. The program can be written in any one of several available high level languages.

The program can also be represented by a design language from which programmers of ordinary skill in the art can write the program details for use on the particular microcomputer used to implement the invention. The choice of a suitable microcomputer is within the skill of the art and depends on the speed, capacity, and level of mathematical operations required for the particular system to be implemented. For example, in the presently illustrated embodiment of the invention, operations other than those to practice the invention would probably be implemented using a microcomputer. Such operations would include the timing and generation of command signals to the components comprising the optical reader and sensing input signals necessary for proper operation of the system. For example, a switch would likely be provided to supply a signal that indicates the door through which a disk is placed on the spindle is open. A command received from a processor to position the head and to read the data would entail starting the motor and positioning the head. The first step might be to sense that the door is shut and provide an error indication if the door is open. The operator would have to close the door before the microprocessor would initiate the steps to read the data.

The system might also be used to perform the function of supplying the focus signal, shown in FIG. 3 as an analog system.

The program for implementing the present invention would likely be included as a subroutine which could be invoked automatically when the system is powered on, when read errors are detected, or manually by the operator.

Such applications might require no more computing power and speed than is found in the lower priced, commercially available microprocessors, e.g., a Z80 (Zilog, Inc.), an 8080 (Intel, Inc.), a MC6800 (Motorola, Inc.), or a COSMAC 1802 (RCA Corp.).

These microprocessors are well known in the art and the auxiliary devices such as memory, read-only memories, and input-output circuit components are readily available and well known in the art.

Each of the microprocessors uses a different instruction set (although the Z80 and 8080 instruction sets are somewhat compatible). Therefore, the exact program depends on the particular microprocessor used. Program design languages, however, have been used for some time in the art to describe the details of a program in sufficient detail for the implementer to program the particular microprocessor used. These design languages also permit the program to be systematically designed from the top down leaving the details until last by use of functional statements and step-wise refinement. For implementation of the present invention, a suitable program could be written from the following design language.

```
var boolean MUX_OUT, A, B;
integer SELECT, PREAMP_ADJ;
real PREAMP_IN, STEP, SUM, AVG;
const real DELSTEP;
equ AVG,SUM;
    [That is, AVG and SUM are the same variable.]
proc COMP;
MUX_OUT := TRUE;
write MUX_OUT;
STEP := 0;
repeat
    write STEP;
    STEP := STEP + DELSTEP;
until MONITOR_PEAK;
SUM := 0;
i := 1;
while i < 5
    SELECT := i;
    write SELECT;
    read PREAMP_IN;
    SUM := SUM + PREAMP_IN;
    i := i + 1;
loop;
shift right SUM; [divides SUM by 2]
shift right SUM;
    [divides SUM by 2 again to get average]
while i < 5
    SELECT := i;
    write SELECT;
    read PREAMP_IN;
    while PREAMP_IN ≠ AVG
      if PREAMP < AVG
        then PREAMP_ADJ := +1;
        else PREAMP_ADJ := −1;
      write PREAMP_ADJ;
    loop
i := i + 1;
```

```
loop;
MUX_OUT := FALSE;
write MUX_OUT;
return
```

While the invention has been particularly shown and described with reference to a preferred embodiment thereof, it will be understood by those skilled in the art that various changes in form and details may be made therein without departing from the spirit and scope of the invention.

What is claimed is:

1. In an optical disc apparatus having
    means including a laser for supplying energy to read and to write information on an optical disc,
    monitor diode means responsive to energy reflected through the laser for supplying a feedback signal to control the laser energy output power, and
    means for focussing said energy on a read plane on the optical disc, the improvement comprising:
    means for establishing substantial best focus comprising
        peak detecting means responsive to said feedback signal for supplying a signal indicative that a peak value in said feedback signal has been attained,
        means responsive to the peak value signal for setting a reference signal; and
        means for controlling said focussing means with respect to the reference signal.

2. The apparatus as claimed in claim 1 wherein said means for controlling said focussing means includes:
    quadrature diode means for supplying signals indicative of focussing error;
    amplifier means responsive to said signals indicative of focussing error and to said reference signal for supplying a correction signal to said focussing means.

3. The apparatus as claimed in claim 2 wherein said amplifier means includes adjustment means responsive to said peak value signal for supplying a zero correction signal when said focussing means is at substantially best focus with respect to the read plane.

* * * * *